June 20, 1944.   C. B. ASKE, JR   2,351,655
WHEEL TRIM AND SECURING MEANS THEREFOR
Filed June 24, 1942   2 Sheets-Sheet 1
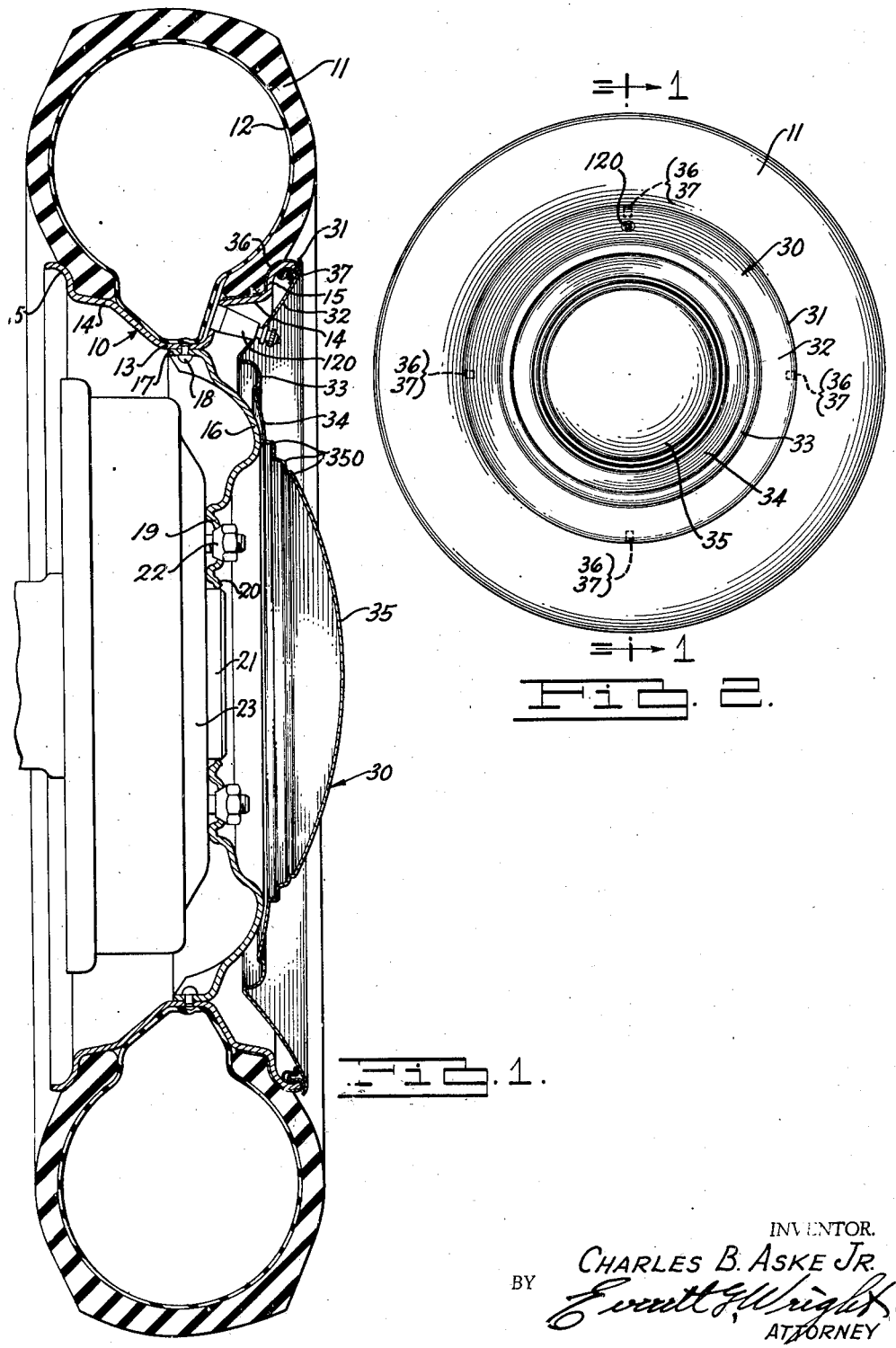
INVENTOR.
CHARLES B. ASKE JR.
BY
ATTORNEY

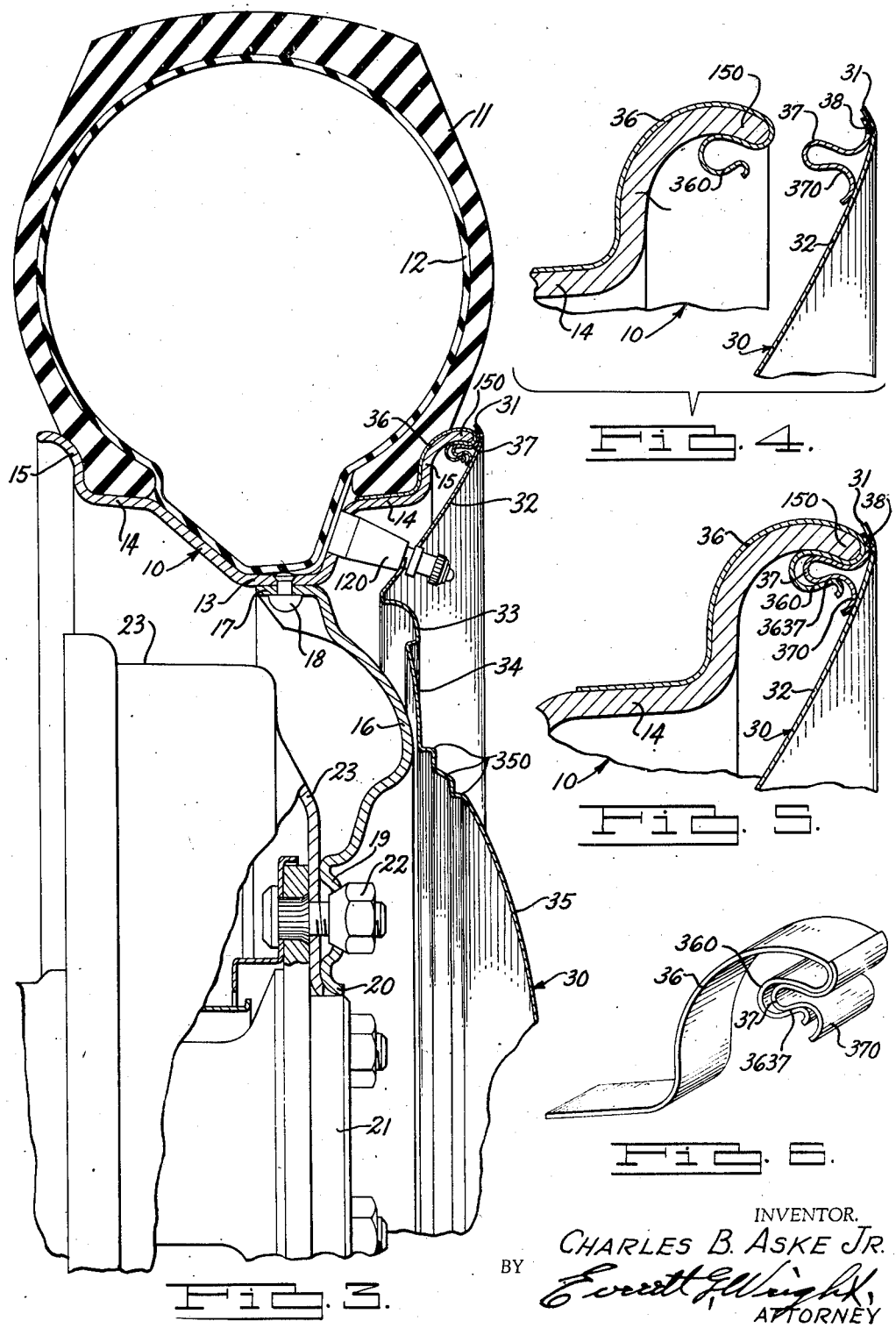

Patented June 20, 1944

2,351,655

UNITED STATES PATENT OFFICE 2,351,655

WHEEL TRIM AND SECURING MEANS THEREFOR

Charles B. Aske, Jr., Detroit, Mich.

Application June 24, 1942, Serial No. 448,264

6 Claims. (Cl. 301—37)

This invention relates to wheel trim for vehicle wheels having conventional pneumatic tires thereon and in particular to wheel trim covering the entire wheel and extending over the rim thereof including means for removably securing the said wheel trim to the wheel.

One object of the invention is to provide wheel trim for vehicle wheels having conventional pneumatic tires thereon which covers the entire wheel producing a pleasing false rim, wheel, hub cap, and white side wall tire effect with a unitary structure including means solely in contact with the rim of the wheel over which the wheel trim is placed for removably securing said wheel trim to said wheel.

Another object of the invention is to provide a wheel trim for vehicle wheels having conventional pneumatic tires thereon including white side wall tire effect wherein the wheel trim extends over the lip of the rim of the vehicle wheel including means for securing the said wheel trim to the said vehicle wheel rim which will admit of the wheel trim flexing under peripheral contact by the tire when said tire becomes extremely soft or flat.

Another object of the invention is to provide wheel trim covering the entire wheel of a vehicle and means for securing the said wheel trim to the vehicle wheel which is resiliently self-centering and which admits of the wheel trim flexing slightly out of round without danger of losing the wheel trim from the vehicle wheel or damaging the said securing means.

Other objects of the invention will become apparent by reference to the following detailed description taken in connection with the accompanying drawings, in which:

Fig. 1 is a vertical sectional view of a conventional vehicle wheel and tire having wheel trim disposed completely over the vehicle wheel and rim thereof, the said wheel trim being resiliently secured to said vehicle wheel at the rim thereof in accordance with the instant invention.

Fig. 2 is a side elevational view of a conventional vehicle wheel and tire showing wheel trim embodying the invention disposed completely over the said vehicle wheel and rim thereof.

Fig. 3 is an enlarged fragmentary vertical sectional view similar to Fig. 1.

Fig. 4 is an exploded greatly enlarged fragmentary sectional view showing wheel trim and securing means embodying the invention.

Fig. 5 is a greatly enlarged fragmentary sectional view similar to Fig. 4 showing wheel trim secured to the rim of a wheel by employing the wheel trim securing means shown in Fig. 6.

Fig. 6 is a view in perspective showing the wheel trim securing means disclosed herein apart from the wheel rim and wheel trim indicating the preferred relationship between the resilient anchor element and the resilient clip of the said wheel trim securing means.

Referring now to the drawings wherein like numerals refer to like and corresponding parts throughout the several views, the illustrative embodiment of the invention disclosed is shown in connection with a conventional vehicle wheel assembly composed of a drop center tire rim 10 having a standard dark grey to black tire 11 and inflatable inner tube 12 thereon, the said tire rim 10 having a base flange 13, intermediate flanges 14, and laterally extending side flanges 15. The stem 120 of the inner tube 12 extends through a suitable aperture provided in the drop center rim 10 as indicated in Figs. 1 and 3. The said wheel assembly also includes an annular body portion or disc 16 having an inwardly turned flange 17 at the outer periphery thereof to which the base flange 13 of the tire rim 10 is secured by such means as the rivets 18. The said annular body portion or disc 16 is preferably formed to provide a radially inwardly disposed fastening flange 19 having an inner margin 20 defining a hub opening to accommodate the outer end of the conventional wheel hub 21.

The fastening flange 19 is preferably apertured at spaced intervals therearound to accommodate bolts 22 by means of which the said wheel assembly is secured to a brake drum 23 conventionally mounted on the hub 21. Because the ornamental hub cap employed is a part of the ornamental wheel trim embodying the invention, the usual hub cap retainer spring elements required to removably secure the hub cap in place are not necessary.

The ornamental wheel trim disc 30 disclosed in the drawings as illustrative of the invention is preferably formed of a resilient metal or other resilient material circular in shape and to a sufficient diameter to extend completely over the wheel assembly with the peripheral edge 31 thereof disposed radially outward from the laterally extending flanges 15 of the rim 10. The said ornamental wheel trim disc 30 comprises an outer annular tire representing portion 32 preferably painted white to represent a white side wall of a tire and which extends radially and axially inward from the periphery 31 of the said ornamental wheel trim disc 30 to an annular rim representation 33. Radially inward from the said annular rim representation 33 is a wheel representing portion 34 which terminates at the central hub cap representing portion 35 ornamented by suitable annular reliefs or ribs 350 to produce the desired hub cap effect.

Thus, the said ornamental wheel trim disc 30 comprises, in radial inward succession from the outer periphery 31 thereof, an outer tire-simulating portion 32, a rim-simulating portion 33, a wheel-simulating portion 34 and a hub cap representation 35, all formed integral in suitable axial relief to produce, by means of the said wheel trim 30 in combination with a standard dark colored tire, a white side wall tire effect, the effect of a smaller wheel than that actually employed, and a hub cap.

To accomplish the visual radially inward continuation of the tire 11 without excessive shadow between the tire 11 and the tire-simulating portion 32 of the ornamental wheel trim disc 30, the periphery 31 of the said ornamental wheel trim disc 30 must not end abruptly at the flange 15 of the drop center rim 10 but must extend completely over and slightly radially outward of the laterally extending side flange 15 of the said drop center rim 10. With the periodic deflation of the inner tube 12 of the tire 11, removably securing the said ornamental wheel trim disc 30 without danger of losing or damaging the same under conditions of running on partially or wholly deflated tires is paramount in the use of wheel trim discs of the type herein disclosed. The problem and difficulties involved have been completely and satisfactorily met by employing securing means for ornamental wheel trim discs 30 as hereinafter described in detail.

The securing means preferably employed comprises a plurality of resilient anchor elements 36 which conform to the upper surface of the intermediate flange 14 and side flange 15 of the drop center rim 10, extend around the lateral extending lip 150 of the side flange 15, and terminate in a free loop 360 disposed below the said laterally extending lip 15 which receives the free loop 370 of resilient clips 37 which are preferably welded at 38 to the back of the ornamental wheel trim disc 30, all as best shown in Figs. 4, 5 and 6. The resilient anchor elements 36 and resilient clips 37 are preferably evenly spaced in pairs around the drop center rim 10 and the ornamental wheel trim 30 respectively. When the ornamental wheel trim 30 and securing means 36 and 37 therefor are furnished as standard equipment on the wheel assembly at the automobile factory, then, the resilient anchor elements 36 may be spot welded to the drop center rim 10. When the ornamental wheel trim 30 is applied as an accessory to automobile wheels after leaving the car factory, then, the tire 11 plus the resilient qualities of the anchor elements 36 securely hold the said anchor elements 36 in place.

By employing free loops 360 and 370 on the resilient anchor elements 36 and resilient clips 37 respectively, radial movement of the wheel trim 30 with respect to the wheel rim 10 is allowed which permits the wheel trim 30 to be flexed out of round by a soft or flat tire without destroying the wheel trim 30 or the anchor elements 36 or the clips 37. Also, the said resilient anchor elements 36 and resilient clips 37 having free loops 360 and 370 respectively permit the wheel trim 30 to flex both radially and axially to admit of application to wheels which are slightly out of round or which are slightly warped. It will be noted that it is preferable to form the resilient anchor elements 36 and resilient clips 37 so that the free ends 360 and 370 thereof have very little area of contact therebetween as best indicated by the numeral 3637 in Figs. 5 and 6. This permits movement between the resilient ornamental wheel trim disc 30 and the rim 10 of the vehicle wheel assembly without undue shearing or bending stresses on the resilient anchors 36 and resilient clips 37, thus preventing permanent distortion thereof and shearing of the resilient clip 37 from the said resilient ornamental wheel trim disc 30.

Although but one embodiment of the invention has been disclosed and described in detail, it is obvious that many changes may be made in the size, shape, arrangement and detail of the various elements of the invention without departing from the scope of the invention as defined by the appended claims, the construction disclosed and described being intended to be illustrative and not limiting.

I claim:

1. Means for removably securing resilient ornamental wheel trim discs of the class described to vehicle wheels comprising a plurality of resilient anchor elements fixed to the said vehicle wheel in spaced relationship around the periphery of the laterally extending lip of the rim of said wheel, a plurality of complementary peripherally spaced resilient clips fixed to said ornamental wheel trim disc in like spaced relationship around the periphery thereof, the said resilient anchor elements and resilient clips being formed into similarly facing axially disposed cooperating pairs of resilient open loops one received within the other and of sufficient resiliency to permit the wheel trim to flex radially and axially to admit of application of said discs to untrue wheels and to admit of the radial and axial flexing of wheels and wheel trim with respect to each other during use.

2. Means for removably securing resilient ornamental wheel trim discs of the class described to vehicle wheels comprising a plurality of resilient anchor elements formed to conform to the upper surface of the drop center rim and extend around the lateral extending lip thereof and become fixed thereto by the tire on said wheel disposed in spaced relationship around the periphery of the rim of said wheel, a plurality of complementary peripherally spaced resilient clips fixed to said ornamental wheel trim disc in like spaced relationship around the periphery thereof, the said resilient anchor elements and resilient clips being formed into similarly facing axially disposed cooperating pairs of resilient loops of sufficient resiliency to permit the wheel trim to flex radially and axially to admit of application of said discs to untrue wheels and the radial and axial flexing of wheels and wheel trim with respect to each other during use.

3. Means for removably securing resilient ornamental wheel trim discs of the class described to vehicle wheels comprising a plurality of resilient anchor elements fixed to the said vehicle wheel in spaced relationship around the periphery of the laterally extending lip of the rim of said wheel, a plurality of complementary peripherally spaced resilient clips fixed to said ornamental wheel trim disc in like spaced relationship around the periphery thereof, the said resilient anchor elements and resilient clips being formed into similarly facing axially disposed cooperating pairs of resilient open loops each having a free flexible end whereby to permit the wheel trim to flex radially and axially to admit of application of said discs to untrue wheels and to admit of the radial and axial flexing of wheels and wheel trim with respect to each other during use.

4. Means for removably securing resilient ornamental wheel trim discs of the class described to vehicle wheels comprising a plurality of resilient anchor elements fixed to the said vehicle wheel in spaced relationship around the periphery of the laterally extending lip of the rim of said wheel, a plurality of complementary peripherally spaced resilient clips fixed to said ornamental wheel trim disc in like spaced relationship around the periphery thereof, the said resilient anchor elements and resilient clips being formed into similarly facing axially disposed cooperating pairs of resilient open loops each having a free flexible end formed to provide a small area of contact between said free ends whereby to permit the wheel trim to flex radially and axially to admit of application of said discs to untrue wheels and the radial and axial flexing of wheels and wheel trim with respect to each other during use.

5. Means for removably securing resilient ornamental wheel trim discs of the class described to vehicle wheels comprising a plurality of resilient anchor elements formed to conform to the upper surface of the drop center rim and extend around the lateral extending lip thereof and become fixed thereto by the tire on said wheel disposed in spaced relationship around the periphery of the rim of said wheel, a plurality of complementary peripherally spaced resilient clips fixed to said ornamental wheel trim disc in like spaced relationship around the periphery thereof, the said resilient anchor elements and resilient clips being formed into similarly facing axially disposed cooperating pairs of resilient loops each having free ends whereby to permit the wheel trim to flex radially and axially to admit of application of said discs to untrue wheels and the radial and axial flexing of wheels and wheel trim with respect to each other during use.

6. Means for removably securing resilient ornamental wheel trim discs of the class described to vehicle wheels comprising a plurality of resilient anchor elements formed to conform to the upper surface of the drop center rim and extend around the lateral extending lip thereof and become fixed thereto by the tire on said wheel disposed in spaced relationship around the periphery of the rim of said wheel, a plurality of complementary peripherally spaced resilient clips fixed to said ornamental wheel trim disc in like spaced relationship around the periphery thereof, the said resilient anchor elements and resilient clips being formed into similarly facing axially disposed cooperating pairs of resilient loops each having free ends formed to provide a small area of contact between said free ends whereby to permit the wheel trim to flex radially and axially to admit of application of said discs to untrue wheels and the radial and axial flexing of wheels and wheel trim with respect to each other during use.

CHARLES B. ASKE, Jr.